US010724681B2

(12) United States Patent
Gearing et al.

(10) Patent No.: US 10,724,681 B2
(45) Date of Patent: Jul. 28, 2020

(54) REST SYSTEM UTILIZING TREKKING POLES

(71) Applicant: Spartan Precision Equipment Ltd., East Sussex (GB)

(72) Inventors: Robert David Gearing, East Sussex (GB); Maxton Gearing, East Sussex (GB); Simon Wilkinson, West Sussex (GB); Craig Coote, West Yorkshire (GB)

(73) Assignee: Spartan Precision Equipment Ltd., East Sussex (GB)

( * ) Notice: Subject to any disclaimer, the term of this patent is extended or adjusted under 35 U.S.C. 154(b) by 190 days.

(21) Appl. No.: 15/737,375

(22) PCT Filed: Jun. 17, 2016

(86) PCT No.: PCT/EP2016/064091
§ 371 (c)(1),
(2) Date: Dec. 18, 2017

(87) PCT Pub. No.: WO2016/203023
PCT Pub. Date: Dec. 22, 2016

(65) Prior Publication Data
US 2018/0187830 A1  Jul. 5, 2018

(30) Foreign Application Priority Data

Jun. 17, 2015 (GB) .................................. 1510671.9

(51) Int. Cl.
*F16M 13/08* (2006.01)
*F16B 1/00* (2006.01)
(Continued)

(52) U.S. Cl.
CPC ............... *F16M 13/08* (2013.01); *A45B 1/00* (2013.01); *A45B 9/02* (2013.01); *F16B 1/00* (2013.01);
(Continued)

(58) Field of Classification Search
CPC ...... A45B 9/02; F16B 1/00; F16B 2001/0035; F16M 11/041; F16M 11/06; F16M 11/26;
(Continued)

(56) References Cited

U.S. PATENT DOCUMENTS 1,138,417 A * 5/1915 Rottennurg .............. A45B 1/00
248/155
1,679,267 A * 7/1928 Rieger ..................... A45B 5/00
248/155
(Continued)

FOREIGN PATENT DOCUMENTS

CN     204 062 410 U   12/2014
CN     204 176 265 U    2/2015
DE  10 2007 047 530 A    4/2009

OTHER PUBLICATIONS

International Search Report and Written Opinion for corresponding Patent Application No. PCT/EP2016/064091 dated Oct. 19, 2016.

*Primary Examiner* — Tan Le
(74) *Attorney, Agent, or Firm* — Osha Liang LLP

(57) ABSTRACT

A rest system for supporting an object in relation to a surface, wherein the system comprises a rest which comprises a head unit to which the object is in use attached, the head unit comprising a support body, an object coupling to which the object is in use attached and at least one leg coupling to which a respective at least one leg is removably attached, and at least one trekking pole which provides the at least one leg.

12 Claims, 4 Drawing Sheets

(51) Int. Cl.
*F16M 11/06* (2006.01)
*F16M 11/04* (2006.01)
*F16M 11/32* (2006.01)
*F16M 11/16* (2006.01)
*A45B 1/04* (2006.01)
*A45B 9/02* (2006.01)
*A45B 3/00* (2006.01)
*F16M 11/28* (2006.01)
*F16M 11/26* (2006.01)
*A45B 1/00* (2006.01)
*A01M 31/02* (2006.01)
*G02B 23/16* (2006.01)
*G02B 23/18* (2006.01)
*G03B 17/56* (2006.01)

(52) U.S. Cl.
CPC .......... *F16M 11/041* (2013.01); *F16M 11/06* (2013.01); *F16M 11/16* (2013.01); *F16M 11/26* (2013.01); *F16M 11/28* (2013.01); *F16M 11/32* (2013.01); *A01M 31/02* (2013.01); *F16B 2001/0035* (2013.01); *G02B 23/16* (2013.01); *G02B 23/18* (2013.01); *G03B 17/561* (2013.01)

(58) Field of Classification Search
CPC ....... F16M 11/28; F16M 11/32; A01M 31/02; G02B 23/16; G02B 23/18; G03B 17/561
USPC ......... 248/55.1, 155.5, 187.1, 177.1; 235/66, 235/75, 84; 396/419, 420
See application file for complete search history.

(56) References Cited

U.S. PATENT DOCUMENTS

| | | | |
|---|---|---|---|
| 3,810,647 A | 5/1974 | Martchenke | |
| 4,786,082 A * | 11/1988 | Swietlik | A45B 5/00 135/66 |
| 7,344,320 B2 * | 3/2008 | Barker | F16M 11/14 135/66 |
| 7,905,667 B2 * | 3/2011 | Barker | F16M 11/14 135/66 |
| 2004/0066064 A1 * | 4/2004 | Neely | A45B 5/00 297/118 |
| 2005/0207749 A1 | 9/2005 | Barker et al. | |
| 2008/0011344 A1 | 1/2008 | Barker | |
| 2009/0057503 A1 | 3/2009 | Hou | |
| 2010/0237206 A1 | 9/2010 | Barker | |

* cited by examiner

REST SYSTEM UTILIZING TREKKING POLES

This application is a national phase of International Application No. PCT/EP2016/064091 filed Jun. 17, 2016 and published in the English language, which claims priority to United Kingdom Patent Application No. 1510671.9 dated Jun. 17, 2015, which are hereby incorporated herein by reference.

The present invention relates to a rest system which utilizes trekking poles, often alternatively referred to as hiking poles or walking poles, as one or more of the support legs, and trekking poles for use with the same.

Tripods are commonly used to support various pieces of equipment, including rifles, scopes, monoculars, binoculars and cameras.

The present inventors have recognized that a tripod rest could be adapted to utilize trekking poles, which would be particularly advantageous where the piece of equipment is being used by a user who also uses trekking poles, as this would reduce the equipment which the user would be required to carry.

In one aspect the present invention provides a rest system for supporting an object in relation to a surface, wherein the system comprises a rest which comprises a head unit to which the object is in use attached, the head unit comprising a support body, an object coupling to which the object is in use attached and at least one leg coupling to which a respective at least one leg is removably attached, and at least one trekking pole which provides the at least one leg.

In one embodiment the object comprises one of a camera, a rifle, a scope, a monocular or binoculars.

In one embodiment the rest comprises a plurality of leg couplings, and a plurality of trekking poles which provide the plurality of legs.

In one embodiment the system further comprises a fixture which is provided to the object and is removably attachable to the rest.

In another embodiment the object is fixed directly to the rest.

In one embodiment the object coupling comprises an attachment member which is pivotably coupled to the support body.

In one embodiment the attachment member of the object coupling includes a magnetic element for providing a magnetic coupling.

In one embodiment the at least one leg coupling is pivotably coupled to the support body about a pivot between a first, outward supporting position in which the at least one leg is splayed outwardly and a second, inward collapsed position in which the at least one leg is inwardly disposed.

In one embodiment the at least one leg coupling comprises an attachment member to which the at least one leg is removably attached.

In one embodiment the attachment member of the at least one leg coupling includes a magnetic element for providing a magnetic coupling.

In one embodiment the attachment member of the at least one leg coupling includes one of a track or follower and the at least one leg includes the other of a counterpart track or follower which is locatable with the track or follower of the at least one leg coupling, such that rotation of the at least one leg causes axial displacement of the at least one leg in relation to the attachment member of the at least one leg coupling.

In one embodiment the at least one trekking pole comprises a pole section which provides the at least one leg.

In one embodiment the at least one trekking pole comprises a removable handle at one end of the pole section.

In one embodiment the at least one trekking pole comprises a foot at the other end of the pole section.

In one embodiment the pole section comprises a plurality of pole elements, which allow for the pole section to have different lengths, optionally being continuously extendable by a telescopic arrangement.

In one embodiment the pole elements are formed of composite materials.

In one embodiment the pole section comprises an attachment member at one end thereof, which is attachable to the attachment member of the respective leg coupling.

In one embodiment the attachment member of the pole section includes a magnetic element for providing a magnetic coupling.

In one embodiment the attachment member of the pole section includes one of a track or follower and the at least one leg coupling includes the other of a counterpart track or follower which is locatable with the track or follower of the pole section, such that rotation of the pole section causes axial displacement of the pole section in relation to the attachment member of the at least one leg coupling.

In one embodiment the handle comprises an attachment member to which the attachment member of the pole section is removably attached.

In one embodiment the attachment member of the handle includes a magnetic element for providing a magnetic coupling.

In one embodiment the attachment member of the handle includes one of a track or follower and the pole section includes the other of a counterpart track or follower which is locatable with the track or follower of the handle, such that rotation of the pole section causes axial displacement of the pole section in relation to the attachment member of the handle.

In one embodiment the rest is a tripod rest with three legs.

In another embodiment the rest is a bi-pod rest with two legs.

In another aspect the present invention provides a trekking pole comprising a pole section, wherein the pole section comprises an attachment member at the one end thereof, which is adapted to be attached to a counterpart attachment member of a separate component.

In one embodiment the pole section comprises a plurality of pole elements, which allow for the pole section to have different lengths, optionally being continuously extendable by a telescopic arrangement.

In one embodiment the pole elements are formed of composite materials.

In one embodiment the attachment member of the pole section includes a magnetic element for providing a magnetic coupling.

In one embodiment the attachment member of the pole section includes one of a track or follower which is locatable with a counterpart track or follower of the attachment member of the separate component, optionally a head unit of rest, such that rotation of the pole section causes axial displacement of the pole section in relation to the attachment member of the separate component.

In one embodiment the trekking pole further comprises a removable handle, wherein the handle comprises an attachment member to which the attachment member of the pole section is removably attached.

In one embodiment the attachment member of the handle includes a magnetic element for providing a magnetic coupling.

In one embodiment the attachment member of the handle includes one of a track or follower which is locatable with the track or follower of the pole section, such that rotation of the pole section causes axial displacement of the pole section in relation to the attachment member of the handle.

Preferred embodiments of the present invention will now be described hereinbelow by way of example only with reference to the accompanying drawings, in which.

Figure 1:
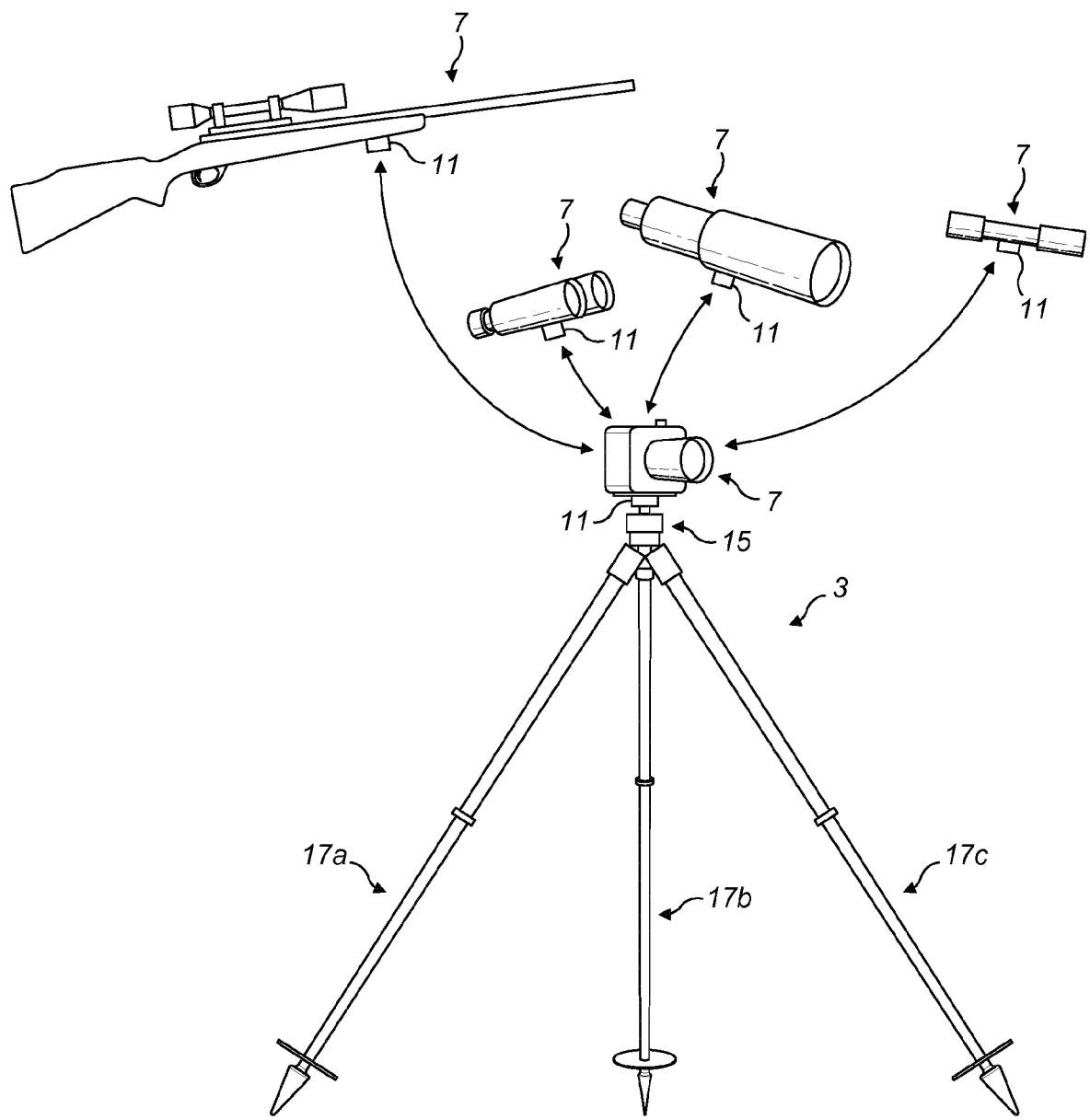
FIG. 1 illustrates a rest system in accordance with a preferred embodiment of the present invention.
Figure 2:
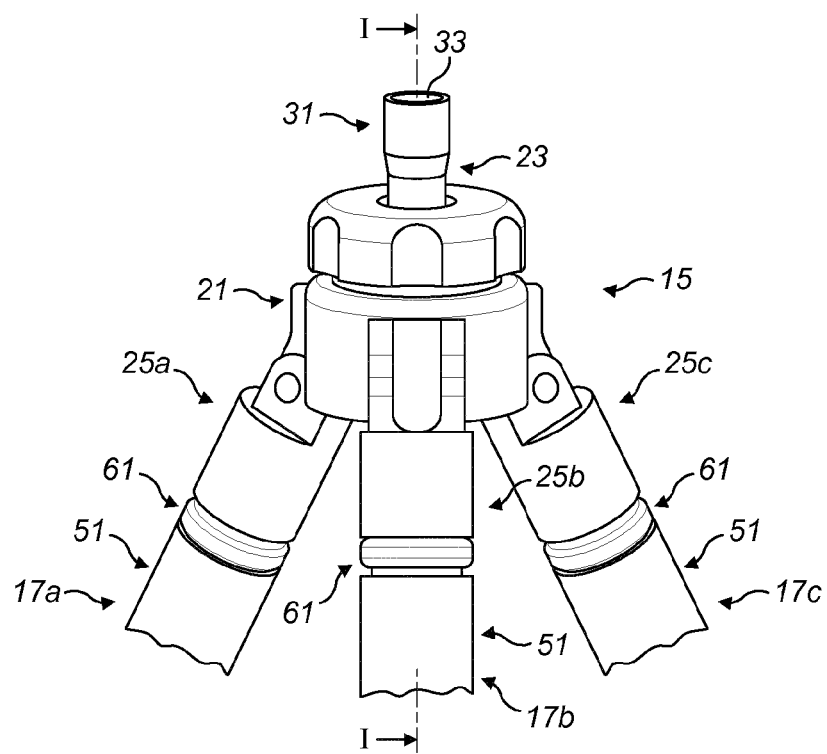
FIG. 2 illustrates the head unit of the rest of the rest system of FIG. 1.
Figure 4A:
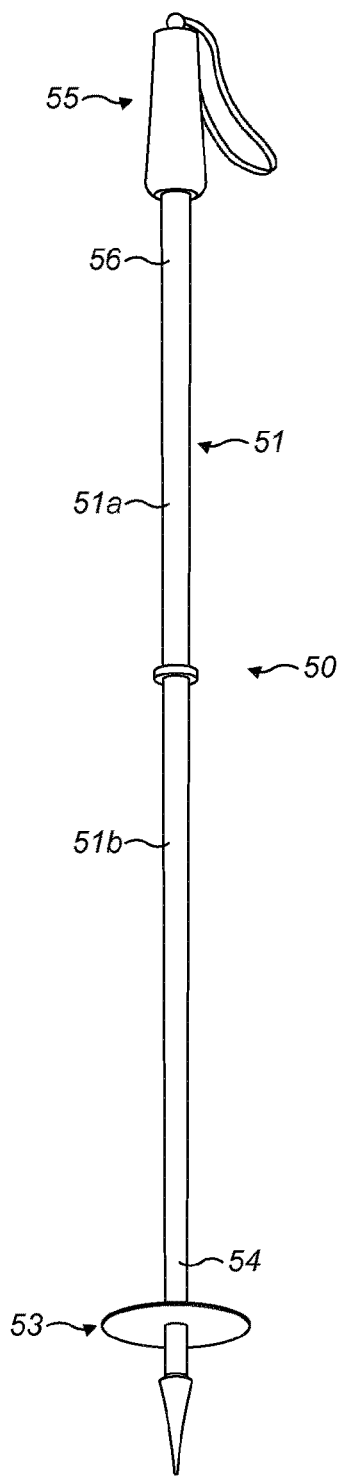
Figure 4B:
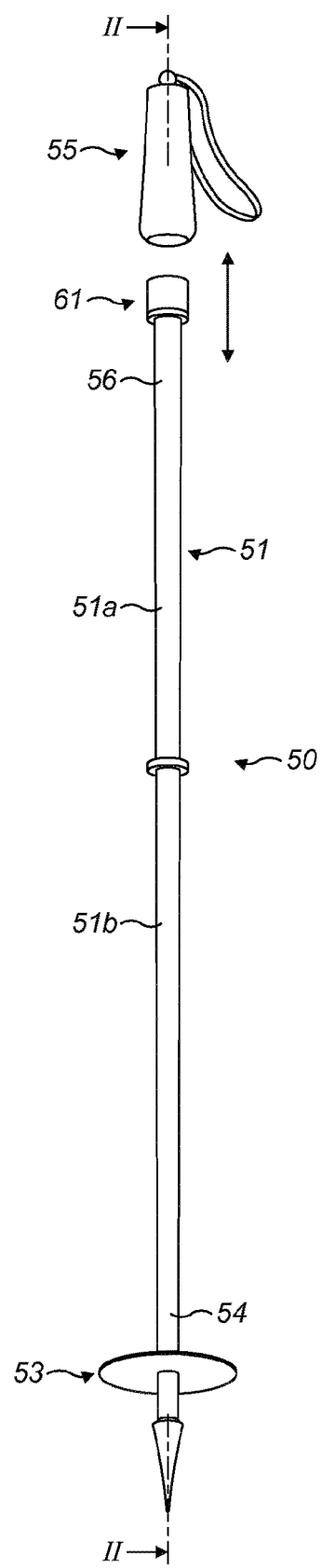
Figure 5:
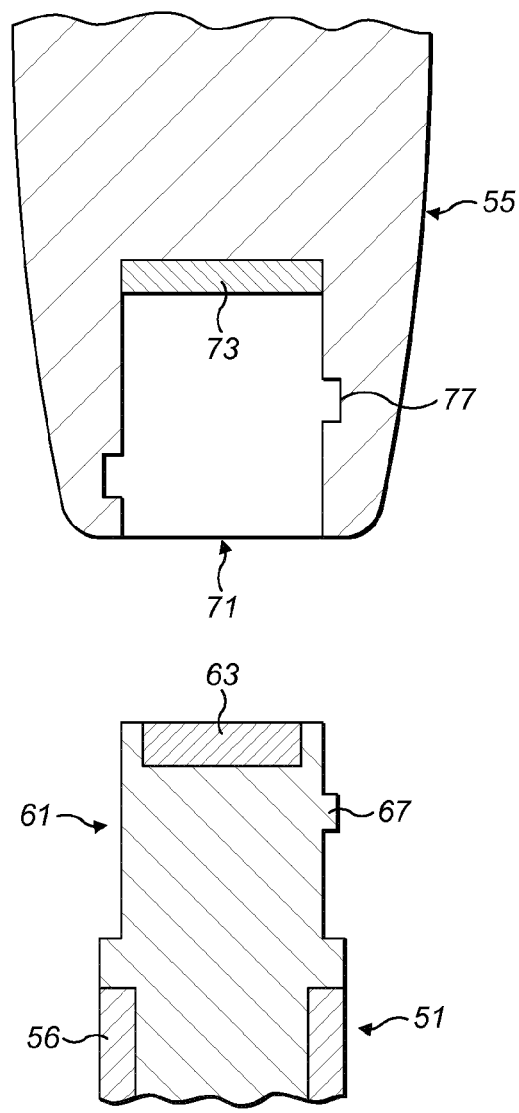

FIGS. 4(a) and (b) illustrate one trekking pole of the rest system of FIG. 1, with the handle fitted and the handle removed, respectively; and FIG. 5 illustrates an enlarged sectional view (along section II-II in FIG. 4(b)) of the attachment of the trekking pole and the support coupling.

The rest system, in this embodiment a tripod rest system, comprises a rest 3 which rests on a surface, such as the ground, and is attached to an object 7. In this embodiment the object 7 comprises one of a camera, a rifle, a scope, a monocular or binoculars.

In this embodiment the rest system further comprises a fixture 11 which is attached to the object 7 and is removably attachable to the rest 3. In an alternative embodiment the fixture 11 could be integrally formed with the object 7.

In an alternative embodiment the object 7 could be fixed directly to the rest 3, such as by a threaded coupling.

The rest 3 comprises a head unit 15 to which the object 7 is attached, and a plurality of legs 17a-c, in this embodiment three legs, at least one of which is provided by a trekking pole 50, which are attached to the head unit 15 and support the head unit 15 and the object 7 supported thereon.

In this embodiment the head unit 15 comprises a support body 21, an object coupling 23 to which the object 7 is attached and a plurality of leg couplings 25a-c, here three leg couplings, to which the legs 17a-c are attached.

In this embodiment the object coupling 23 comprises an attachment member 31 which is pivotably coupled to the support body 21, here by means of a ball coupling 32.

In this embodiment the attachment member 31 is in the form a male projection, but alternatively could be a female recess.

In this embodiment the attachment member 31 includes a magnetic element 33 which attracts or is attracted to a counterpart magnetic element 83 of the object fixture 11, as will be described in more detail hereinbelow.

In one embodiment the magnetic element 33 comprises a magnet, here provided as a magnet pair which is located to opposite sides of the axis of rotation. In this embodiment the magnet is formed of a Neodymium-based material.

In this embodiment the attachment member 31 has the form of a spigot which has a circular or near-circular section, which allows for rotation of the object fixture 11, and hence the object 7, thereabout, allowing for smooth rotation of the object 7 about the rest 3 when planted on a surface.

In this embodiment the leg couplings 25a-c are pivotably coupled to the support body 21 about a pivot 40 between a first, outward supporting position in which the legs 17a-c are splayed and a second, inward collapsed position in which the legs 17a-c are adjacent and allow the rest 3 to be carried more easily.

In this embodiment the leg couplings 25a-c each comprise an attachment member 41 to which a respective one of the legs 17a-c is removably attached.

In this embodiment the attachment member 41 is in the form a female recess, but alternatively could be a male projection.

In this embodiment the attachment member 41 includes a magnetic element 43 which attracts or is attracted to a counterpart magnetic element 63 of the attachment member 61 of the respective leg 17a-c, as will be described in more detail hereinbelow.

In one embodiment the magnetic element 43 comprises a magnet. In this embodiment the magnet is formed of a Neodymium-based material.

In this embodiment the attachment member 41 includes a track 47, here in the form of a recess, which receives a counterpart follower 67 on the attachment member 61 of the respective leg 17a-c.

This arrangement allows for mechanical coupling in addition to the magnetic coupling, through relative rotation of the respective leg 17a-c in relation to the attachment member 41.

This arrangement also allows, by configuration of the track 47 and the follower 67 to provide a camming action, the relatively-high force of the magnetic coupling to be overcome by a lower rotational force, in rotating the respective leg 17a-c in relation to the attachment member 41.

In this embodiment the legs 17a-c are provided by trekking poles 50, as illustrated in FIGS. 4(a) and (b), which each comprise an elongate pole section 51, a foot 53 at one, lower end 54 of the pole section 51 and a handle 55 at the other, upper end 56 of the pole section 51.

In this embodiment the pole section 51 comprises a plurality of elements 51a, b, which allow for the pole section 51 to have different lengths, here being continuously extendable by a telescopic arrangement.

In this embodiment the leg elements 51a, b are formed of composite materials.

In this embodiment each foot 53 has a spike or point, in order to allow for stable resting on a surface. In one embodiment the foot 53 is interchangeable, in order to suit different ground types, such as with a rubberized tip.

In this embodiment the pole section 51 comprises an attachment member 61 at the one upper end thereof, which is adapted to be attached to the attachment member 41 of the respective leg coupling 25a-c of the head unit 15.

In this embodiment the attachment member 61 is in the form a male projection, but alternatively could be a female recess where the attachment member 41 of the respective attachment coupling of the head 15 is a male projection.

In this embodiment, as illustrated in FIG. 5, the attachment member 61 includes a magnetic element 63 which attracts or is attracted to a counterpart magnetic element 43 of the attachment member 41 of the respective leg coupling 25a-c of the head unit 15.

In one embodiment the magnetic element 63 comprises a magnet. In this embodiment the magnet is formed of a Neodymium-based material.

In this embodiment the attachment member 61 includes a follower 67 which is counterpart to the track 47 on the attachment member 41 of the respective leg coupling 25a-c of the head unit 15 and also counterpart to the track 77 on the attachment member 71 of the handle 55, as will be described in more detail hereinbelow.

As noted hereinabove, this arrangement allows, by configuration of the track 47 and the follower 67 to provide a camming action, the relatively-high force of the magnetic coupling to be overcome by a lower rotational force, in rotating the respective leg 17a-c in relation to the attachment member 41 of the head unit 15.

In this embodiment the handle 55 comprises an attachment member 71 to which the pole section 51 is removably attached.

In this embodiment the attachment member 71 is in the form a female recess, but alternatively could be a male projection.

In this embodiment the attachment member 71 includes a magnetic element 73 which attracts or is attracted to a counterpart magnetic element 63 of the attachment member 61 of the pole section 51.

In this embodiment the attachment member 71 includes a track 77, here in the form of a recess, which receives a counterpart follower 67 on the attachment member 61 of the pole section 51.

As discussed hereinabove, this arrangement also allows, by configuration of the track 77 and the follower 67 to provide a camming action, the relatively-high force of the magnetic coupling to be overcome by a lower rotational force, in rotating the pole section 51 in relation to the handle 55.

Figure 3:
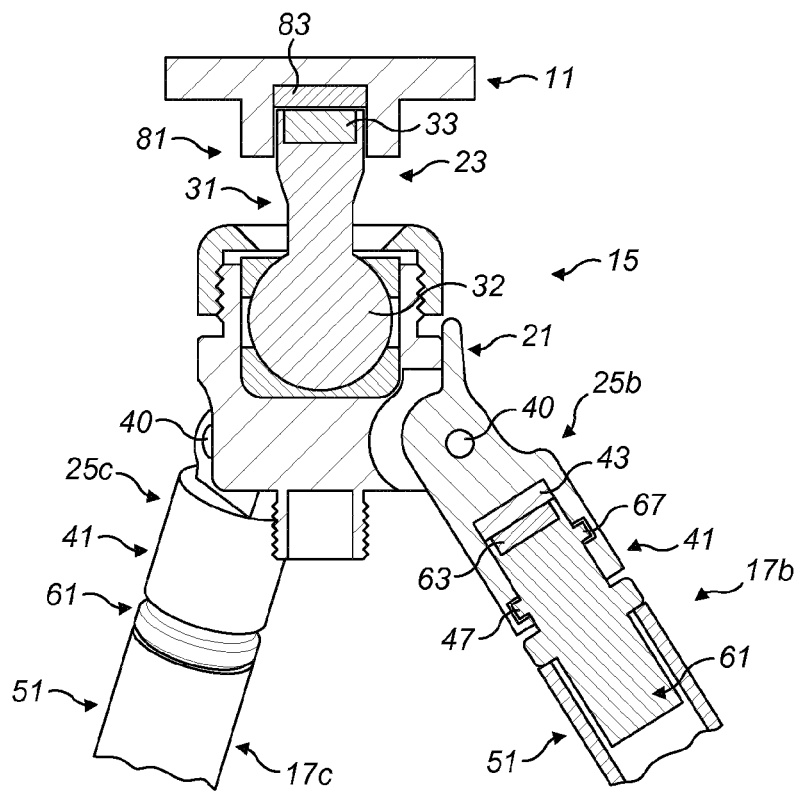
FIG. 3 illustrates a vertical sectional view (along section I-I in FIG. 2) of the head unit of FIG. 2.

In this embodiment, as illustrated in FIG. 3, the object fixture 11 comprises an attachment member 81 which includes a magnetic element 83 which attracts or is attracted to the counterpart magnetic element 33 of the head unit 15.

In this embodiment the attachment member 81 is in the form a female recess, but alternatively could be a male projection where the attachment member 31 of the object coupling 23 of the head unit 15 is a female projection.

Finally, it will be understood that the present invention has been described in its preferred embodiment and can be modified in many different ways without departing from the scope of the invention as defined by the appended claims.

For example, in one embodiment the rest 3 could be formed as a bi-pod rest with two legs 17a, b.

The invention claimed is:

1. A rest system for supporting an object in relation to a surface, the system comprising:
   a rest comprising:
      a head unit to which the object is in use attached, the head unit comprising:
         a support body,
         an object coupling to which the object is in use attached,
         a plurality of leg couplings to which a respective plurality of legs is removably attached,
      a plurality of trekking poles which provide the plurality of legs, and
      an attachment member which is pivotably coupled to the support body, the attachment member of the object coupling includes a magnetic element for providing a magnetic coupling;
   wherein the at least one leg coupling comprises an attachment member to which the at least one leg is removably attached; and
   wherein the attachment member of the at least one leg coupling includes a magnetic element for providing a magnetic coupling and the attachment member of the at least one leg coupling includes one of a track or follower and the at least one leg coupling includes the other of a counterpart track or follower which is locatable with the track or follower of the at least one leg coupling, such that rotation of the at least one leg causes axial displacement of the at least one leg in relation to the attachment member of the at least one leg coupling.

2. The system of claim 1, wherein the object comprises one of a camera, a rifle, a scope, a monocular or binoculars.

3. The system of claim 1, wherein:
   (i) the system further comprises a fixture which is provided to the object and is removably attachable to the rest, or
   (ii) the object is fixed directly to the rest.

4. The system of claim 1, wherein the at least one leg coupling is pivotably coupled to the support body about a pivot between a first, outward supporting position in which the at least one leg is splayed outwardly and a second, inward collapsed position in which the at least one leg is inwardly disposed.

5. The system of claim 1, wherein the at least one trekking pole comprises a pole section which provides the at least one leg.

6. The system of claim 5, wherein the at least one trekking pole comprises a removable handle at one end of the pole section, and the at least one trekking pole comprises a foot at the other end of the pole section.

7. The system of claim 5, wherein the pole section comprises a plurality of pole elements, which allow for the pole section to have different lengths, being continuously extendable by a telescopic arrangement, the pole elements are formed of composite materials.

8. The system of claim 5, wherein the pole section comprises an attachment member at one end thereof, which is attachable to the attachment member of the respective leg coupling.

9. The system of claim 8, wherein the attachment member of the pole section includes a magnetic element for providing a magnetic coupling and/or the attachment member of the pole section includes one of a track or follower and the at least one leg coupling includes the other of a counterpart track or follower which is locatable with the track or follower of the pole section, such that rotation of the pole section causes axial displacement of the pole section in relation to the attachment member of the at least one leg coupling.

10. The system of claim 6, wherein the handle comprises an attachment member to which the attachment member of the pole section is removably attached.

11. The system of claim 10, wherein the attachment member of the handle includes a magnetic element for providing a magnetic coupling and/or the attachment member of the handle includes one of a track or follower and the pole section includes the other of a counterpart track or follower which is locatable with the track or follower of the handle, such that rotation of the pole section causes axial displacement of the pole section in relation to the attachment member of the handle.

12. The system of claim 1, wherein the rest is a tripod rest with three legs or a bi-pod rest with two legs.

* * * * *